US006899341B2

(12) United States Patent
Neumaier

(10) Patent No.: US 6,899,341 B2
(45) Date of Patent: May 31, 2005

(54) SEALING ELEMENT FOR PLACING BETWEEN AN INJECTOR AND A CYLINDER HEAD AND AN INJECTOR AND A CYLINDER HEAD PROVIDED WITH A SEALING ELEMENT OF THIS TYPE

(75) Inventor: Martin Neumaier, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 4 days.

(21) Appl. No.: 10/436,290

(22) Filed: May 12, 2003

(65) Prior Publication Data

US 2003/0201612 A1 Oct. 30, 2003

Related U.S. Application Data

(63) Continuation of application No. PCT/DE01/04121, filed on Oct. 31, 2001.

(30) Foreign Application Priority Data

Nov. 10, 2000 (DE) ........................................ 100 55 641

(51) Int. Cl.[7] ................................................ F16J 15/02
(52) U.S. Cl. ........................ 277/647; 277/598; 123/470
(58) Field of Search ................................. 277/502, 647, 277/598; 123/470; 251/333, 363, 364

(56) References Cited

U.S. PATENT DOCUMENTS

| | | | | | |
|---|---|---|---|---|---|
| 2,204,507 | A | * | 6/1940 | Martin | 277/647 |
| 2,345,515 | A | * | 3/1944 | Tweedale | 277/638 |
| 2,366,161 | A | * | 1/1945 | Tweedale | 277/638 |
| 3,595,588 | A | * | 7/1971 | Rode | 277/650 |
| 3,761,102 | A | * | 9/1973 | Nicholson | 277/647 |
| 4,519,371 | A | * | 5/1985 | Nagase et al. | 123/470 |
| 4,602,888 | A | * | 7/1986 | Court et al. | 403/28 |
| 4,877,272 | A | * | 10/1989 | Chevallier et al. | 285/111 |
| 4,946,174 | A | * | 8/1990 | Usui | 277/645 |
| 5,044,340 | A | * | 9/1991 | Robnett | 123/470 |
| 5,247,918 | A | * | 9/1993 | Wakeman | 123/470 |
| 5,354,072 | A | * | 10/1994 | Nicholson | 277/647 |
| 5,785,024 | A | * | 7/1998 | Takei et al. | 123/470 |
| 6,009,856 | A | | 1/2000 | Smith, III et al. | |
| 6,042,121 | A | * | 3/2000 | Ma et al. | 277/608 |
| 6,286,839 | B1 | * | 9/2001 | Mitsui et al. | 277/603 |
| 6,318,339 | B1 | * | 11/2001 | Hofmann | 123/469 |
| 6,334,433 | B1 | * | 1/2002 | Sumida et al. | 123/470 |
| 6,460,512 | B1 | * | 10/2002 | Serio | 123/470 |

FOREIGN PATENT DOCUMENTS

| | | | |
|---|---|---|---|
| DE | 2622803 | 12/1976 | H01T/13/02 |
| DE | 2824476 C2 | 3/1983 | F02M/61/14 |
| DE | 69114454 T2 | 7/1996 | F16F/3/10 |
| DE | 19807819 C1 | 5/1999 | F02M/61/14 |
| GB | 1312338 | 4/1973 | F16J/15/08 |
| JP | 11210886 | 8/1999 | F16J/15/08 |
| WO | 02/38945 A1 | 5/2002 | F02M/61/14 |

OTHER PUBLICATIONS

PCT Supplemental Form 2000P20059WO; 11 pages, Oct. 30, 2001.

PCT International Preliminary Examination Report PCT/DE01/04121; 5 pages, Filed Oct. 31, 2001.

* cited by examiner

*Primary Examiner*—Alison K. Pickard
(74) *Attorney, Agent, or Firm*—Baker Botts L.L.P.

(57) ABSTRACT

The sealing element has a ring consisting of an elastic material. The ring consists of a continuous support section, a first sealing lip, formed thereon for sealing the injector and a second sealing lip for sealing the cylinder head. The sealing lips project substantially inwards in a radial direction and together with the support section form a continuous groove of the ring. The axial thicknesses of the sealing lips are measured in such a way that said sealing lips have a deformable plasticity for sealing purposes, which depends on a predetermined force that is used to fix the injector in the cylinder head. The radial thickness of the support section is greater than the axial thickness of the sealing lips and is measured in such a way that the support section prevents the sealing element from being compressed, when said element is placed between the injector and the cylinder head.

15 Claims, 2 Drawing Sheets

SEALING ELEMENT FOR PLACING BETWEEN AN INJECTOR AND A CYLINDER HEAD AND AN INJECTOR AND A CYLINDER HEAD PROVIDED WITH A SEALING ELEMENT OF THIS TYPE

CROSS-REFERENCE TO RELATED APPLICATION

This application is a continuation of co-pending International Application No. PCT/DE01/04121 filed Oct. 31, 2001 which designates the United States, and claims priority to German application number DE10055641.8 filed Nov. 10, 2000.

TECHNICAL FIELD OF THE INVENTION

The invention relates to a sealing element for placing between an injector and a cylinder head. The invention also relates to an injector and a cylinder head provided with a sealing element of this type.

BACKGROUND OF THE INVENTION

An injector located in an opening in a cylinder head is usually provided in a fuel injection system. The injector serves to inject fuel into a combustion chamber located in the cylinder head. The injector has a valve stem and it should be possible to adjust the rounded projection of said valve stem very precisely in the combustion chamber. An upper section of the injector abuts the valve stem and has a larger cross-section than the valve stem. The upper section of the injector and of the valve stem form a step, which rests on a continuous contact surface of the cylinder head located in the opening. A sealing element is placed between the injector and the cylinder head to seal the combustion chamber off from its surroundings. Generally the sealing element is configured in the form of a perforated disk with a rectangular cross-section perpendicular to the plane of the disk and it is positioned on the contact surface of the cylinder head. As the injector is being fixed in the cylinder head, the sealing element is pressed against the injector and against the cylinder head in such a way that substances in the combustion chamber cannot escape.

The injector must be pressed so firmly against the cylinder head that the sealing element is subject to plastic deformation, to accommodate any irregularities in the cylinder head and the injector. In the case of a sealing element in the form of a disk, the fixing force required to fix the injector in the cylinder head is so large that even the injector could be deformed.

SUMMARY OF THE INVENTION

The object of the invention is to specify a sealing element for placing between an injector and a cylinder head, which requires a smaller fixing force for sealing purposes than the prior art and which does not at the same time adversely affect the precision of adjustment of the rounded projection of the injector.

The object is achieved by means of a sealing element for placing between an injector and a cylinder head with the following features: The sealing element has a one-piece ring consisting of a flexible material. The ring consists of a continuous support section, a first sealing lip formed thereon for sealing the injector and a second sealing lip formed thereon for sealing the cylinder head. The first sealing lip and the second sealing lip project inwards in a radial direction and together with the support section form a continuous groove of the ring. The axial thickness of the first sealing lip and the axial thickness of the second sealing lip are measured in such a way, on the basis of a predetermined force to be used to fix the injector in the cylinder head, that the sealing lips have adequate deformable plasticity for sealing purposes. The radial thickness of the support section is greater than the axial thickness of the sealing lips and is measured in such a way that the support section prevents the sealing element from being compressed when said sealing element is placed between the injector and the cylinder head.

The sealing lips serve for sealing purposes, while the support section prevents the sealing element from being compressed when the injector is being pressed onto the cylinder head, thereby allowing precise adjustment of the rounded projection of the injector.

The fixing force required for sealing purposes in order to subject the sealing lips to plastic deformation and to accommodate irregularities in the cylinder head and the injector, is smaller, the thinner the axial thickness of the sealing lips. Compression of the sealing element is prevented more reliably, the larger the radial thickness of the support section. For this reason the axial thicknesses of the sealing lips are smaller than the radial thickness of the support section. The axial thicknesses of the sealing lips and the radial thickness of the support section can be optimized independently of each other.

As the groove is open to the combustion chamber and there is high pressure in the combustion chamber, the sealing lips are pushed outwards by the combustion chamber pressure. The first sealing lip is therefore pushed onto the injector, while the second sealing lip is pushed onto the cylinder head. This reinforces the sealing effect of the sealing element.

A particularly low level of compression of the sealing element and at the same time a particularly good sealing effect are achieved with a small fixing force, if the radial thickness of the support section is at least 3 to 5 times bigger than the axial thickness of the sealing lips.

It is advantageous to position the sealing lips so that the distance between the sealing lips increases in the direction of the center of the ring. This form of the sealing element results in the sealing lips being pushed with more force against the injector and cylinder head, increasing the sealing effect of the sealing element.

The cylinder head has an opening for insertion of the injector, with a continuous contact surface for the injector located in said opening. The sealing element is positioned on the contact surface. The injector is fixed in the cylinder head in such a way that the injector is pushed onto the sealing element against the contact surface of the cylinder head.

Insertion of the injector into the cylinder head is facilitated if the sealing element can be fixed non-positively around the valve stem of the injector. On the one hand this reduces the probability of the sealing element being forgotten during insertion of the injector into the cylinder head. It also reduces the probability of losing the small sealing element.

For this purpose a bent clamping wire is positioned in the groove of the ring. The clamping wire has at least two protuberances, for example in the form of corners, which engage in the groove in such a way that the clamping wire is clamped in the ring. The clamping wire is configured in such a way that when the sealing element passes over the valve stem of the injector, the clamping wire and therefore the sealing element are fixed non-positively around the valve stem. Connecting sections of the clamping wire, which connect the protuberances of the clamping wire to each other, push against the valve stem from at least two sides.

The protuberances may be rounded. For example the clamping wire is bent in such a way that it forms an ellipse.

The clamping wire may have more than two protuberances.

The clamping wire consists for example of spring steel.

To simplify insertion of the clamping wire into the groove of the ring, it is advantageous for the clamping wire to have two ends that are not connected to each other.

BRIEF DESCRIPTION OF THE DRAWINGS

An embodiment of the invention is described below in more detail using the figures.

FIG. 4 shows a cross-section through an injector and a cylinder head with the sealing element placed between.

DETAILED DESCRIPTION OF THE PREFERRED EMBODIMENTS

In the embodiment a sealing element is provided which has a ring R made of soft iron or copper. The ring R comprises a support section S, a first sealing lip D1 formed thereon for sealing an injector I and a second sealing lip D2 formed thereon for sealing a cylinder head Z (see FIGS. 1 and 2).

The support section S has a radial thickness of 2–3 mm and an axial thickness of 2–3 mm. The sealing lips D1, D2 project substantially inwards in a radial direction and together with the support section S form a continuous groove of the ring R (see FIG. 2). The sealing lips D1, D2 have a radial length of approx. 3 mm. The axial thickness of the sealing lips D1, D2 is approx. 0.8 mm.

The distance between the sealing lips D1, D2 increases in the direction of the center of the ring. The sealing lips D1, D2 form an angle of inclination of approx. 10° with a radial axis.

Figure 1:
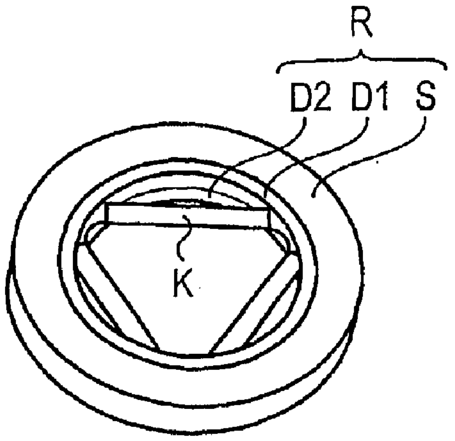
FIG. 1 shows a top view of a sealing element with a first clamping wire and a ring comprising a support section and two sealing lips.
Figure 2:
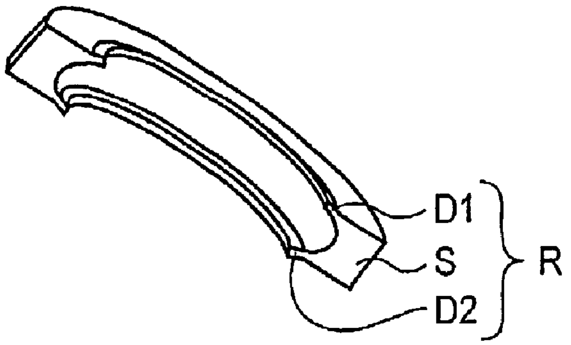
FIG. 2 shows a cross-section through the ring of the sealing element.
Figure 3A:
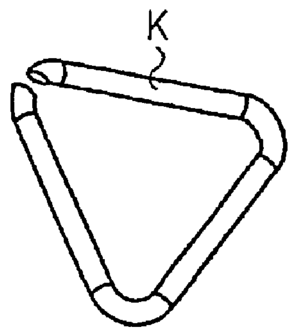
FIG. 3*a* shows a top view of the first clamping wire.

A first clamping wire K is positioned in the groove of the ring R (see FIG. 1). The first clamping wire has three corners and two ends not connected to each other (see FIG. 3*a*). The three corners of the first clamping wire K engage in the groove of the ring R in such a way that the first clamping wire K is clamped in the ring R. The distance from the center of the ring to a connecting section between two corners of the first clamping wire K is smaller than the radius of a valve stem V of the injector I. This causes the sealing element to be fixed non-positively to the valve stem V when it passes over the valve stem V.

Figure 3B:
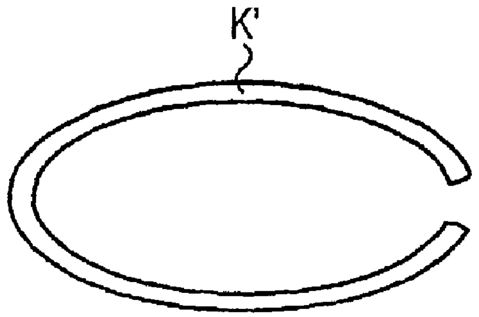
FIG. 3*b* shows a top view of a second clamping wire.

Instead of the first clamping wire K a second clamping wire K' can also be used and this is bent to an ellipse (see FIG. 3*b*).

Figure 4:
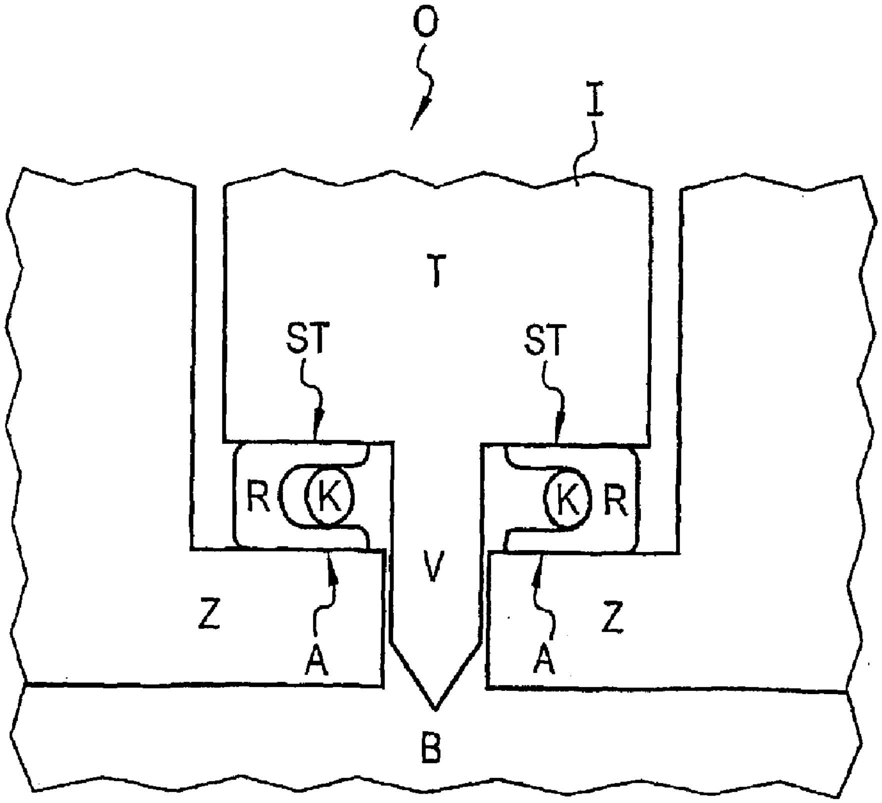

The cylinder head Z has an opening O for insertion of the injector I. In the opening O the cylinder head Z has a continuous contact surface A for the injector I. The sealing element is positioned on the contact surface A (see FIG. 4). The injector I has an upper section T, which abuts the valve stem V and has a larger cross-section than the valve stem V. The valve stem V and the upper section T of the injector I form a step ST. The injector I is fixed in the cylinder head Z in such a way that the step ST of the injector I is pushed onto the sealing element against the contact surface A of the cylinder head Z (see FIG. 4). A rounded section of the valve stem V projects approx. 2–3 mm into a combustion chamber B of the cylinder head Z.

The force with which the injector I is fixed in the cylinder head Z subjects the sealing lips D1 and D2 to plastic deformation in such a way that they seal the combustion chamber B off radially from its surroundings. The adequate radial thickness of the support section S means that the sealing element is only subject to insignificant compression. The pressure in the combustion chamber pushes the first sealing lip D1 against the step of the injector I and the second sealing lip D2 against the contact surface A of the cylinder head Z.

The preceding description of the exemplary embodiments according to the present invention is intended only for illustrative purposes and not for the purpose of restricting the invention. Within the scope of the invention, various changes and modifications are possible without departing from the scope of the invention and its equivalents.

What is claimed is:

1. A sealing element for placing between an injector and a cylinder head, said element comprising: a one-piece ring consisting of a flexible material, said ring providing a continuous support section having a radial thickness, a first sealing lip formed thereon for sealing the injector and a second sealing lip formed thereon for sealing the cylinder head, said sealing lips project substantially inwards in a radial direction and together with the support section form a continuous groove, an axial thickness of the first sealing lip and the axial thickness of the second sealing lip are predetermined on the basis of a force to be used to fix the injector in the cylinder head such that the sealing lips deform under plastic deformation for sealing purposes, wherein the radial thickness of the support section is greater than the axial thicknesses of the sealing lips and is predetermined such that the support section prevents the sealing element from being compressed when said sealing element is placed between the injector and the cylinder head, and a clamping wire position in the groove.

2. A sealing element according to claim 1, wherein the sealing lips are positioned such that the distance between the sealing lips increases in the direction of the center of the ring.

3. The sealing element according to claim 1, wherein the cylinder head has an opening for insertion of the injector, the cylinder head has a continuous contact surface for the injector in the opening, the sealing element is positioned on the contact surface, the injector is fixed in the cylinder head such that the injector is pressed onto the sealing element against the contact surface.

4. A sealing element for placing between an injector and a cylinder head, said element comprising:

a one-piece ring consisting of flexible material, said ring providing a continuous support section having a radial thickness;

a first sealing lip formed thereon for sealing the injector and a second sealing lip formed thereon for sealing the cylinder head, said sealing lips project substantially inwards in a radial direction and together with the support section form a continuous groove;

an axial thickness of the first sealing lip and the axial thickness of the second sealing lip are predetermined on the basis of a force to be used to fix the injector in the cylinder head such that the sealing lips have adequate deformable plasticity for sealing purposes, wherein the radial thickness of the support section is greater than the axial thicknesses of the sealing lips and is predetermined such that the support section prevents the sealing element from being compressed when said sealing element is placed between the injector and the cylinder head; and a bent clamping wire, said wire positioned in the groove, said clamping wire forming at least two protuberances that engage in the groove to clamp the clamping wire in the ring, wherein the clamping wire is configured such that when the sealing element passes over a valve stem of the injector, the clamping wire of the sealing element is fixed non-positively around the valve stem.

5. A sealing element according to claim 4, wherein the protuberances of the clamping wire are configured as corners.

6. A sealing element according to claim 4, wherein the clamping wire forms an ellipse.

7. Sealing element according to claim 4, wherein the clamping wire has two ends not connected to each other.

8. A sealing element according to claim 4, wherein said sealing element is adapted to be fixed non-positively around the valve stem of the injector due to the clamping wire.

9. A sealing element for placing between an injector and a cylinder head, said element comprising:

a ring having first and second lids and a support section, said lips having axial thicknesses to adequate deformable plasticity for sealing purposes, said support section having a radial thickness, wherein said radial thickness is greater than the axial thicknesses of the lips and prevents the sealing element from being compressed when said sealing element is placed between the injector and the cylinder head; and a bent clamping wire, said clamping wire forming at least two protuberances that engage to clamp the clamping wire in the ring.

10. A sealing element according to claim 9, wherein the sealing lips are positioned such that the distance between the sealing lips increases in the direction of the center of the ring.

11. A sealing element according to claim 9, wherein the protuberances of the clamping wire are configured as corners.

12. A sealing element according to claim 9, wherein the clamping wire forms an ellipse.

13. Sealing element according to claim 9, wherein the clamping wire has two ends not connected to each other.

14. The sealing element according to claim 9, wherein the cylinder head has an opening for insertion of the injector, the cylinder head has a continuous contact surface for the injector in the opening, the sealing element is positioned on the contact surface, the injector is fixed in the cylinder head such that the injector is pressed onto the sealing element against the contact surface.

15. A sealing element according to claim 9, adapted to be fixed non-positively around the valve stem of the injector due to the clamping wire.

* * * * *